US010962669B2

(12) United States Patent
Zhou

(10) Patent No.: US 10,962,669 B2
(45) Date of Patent: Mar. 30, 2021

(54) METHOD AND DEVICE FOR ENHANCED SEISMIC IMAGING BASED ON ONE-WAY WAVE EQUATION

(71) Applicant: China Petroleum & Chemical Corporation, Beijing (CN)

(72) Inventor: Min Zhou, Houston, TX (US)

(73) Assignee: China Petroleum & Chemical Corporation, Beijing (CN)

( * ) Notice: Subject to any disclaimer, the term of this patent is extended or adjusted under 35 U.S.C. 154(b) by 0 days.

(21) Appl. No.: 16/730,404

(22) Filed: Dec. 30, 2019

(65) Prior Publication Data

US 2020/0209419 A1 Jul. 2, 2020

Related U.S. Application Data

(60) Provisional application No. 62/786,274, filed on Dec. 28, 2018.

(51) Int. Cl.
*G01V 1/36* (2006.01)
*G01V 1/00* (2006.01)
*G01V 1/30* (2006.01)

(52) U.S. Cl.
CPC .............. *G01V 1/364* (2013.01); *G01V 1/003* (2013.01); *G01V 1/303* (2013.01); *G01V 2210/675* (2013.01)

(58) Field of Classification Search
CPC ........ G01V 1/364; G01V 1/303; G01V 1/003; G01V 2210/675
See application file for complete search history.

(56) References Cited

U.S. PATENT DOCUMENTS

| 6,832,160 B2 * | 12/2004 | Vinje | G01V 1/282 |
| | | | 702/14 |
| 2016/0282490 A1 * | 9/2016 | Qin | G01V 1/282 |

OTHER PUBLICATIONS

Luo et al., Scattering Angle Based Simultaneous Estimation for Velocity and Density, Oct. 17, 2018, 2018 SEG International Exposition and Annual Meeting, Anaheim, CA, pp. 1344-1348 (Year: 2018).*
Abstract of Luo et al., Oct. 17, 2018, 3 pp. (Year: 2018).*

* cited by examiner

*Primary Examiner* — Toan M Le
(74) *Attorney, Agent, or Firm* — Novick, Kim & Lee, PLLC; Allen Xue

(57) ABSTRACT

A method for seismic processing includes steps of receiving seismic data comprising seismic waveforms acquired from a plurality of seismic receivers and a plurality of seismic sources in a subterranean area; generating a plurality of full wavefields at a plurality of corresponding propagation time steps based on a seismic velocity and a density model of the subterranean area; and applying a wavefield filter to the plurality of full wavefields to obtain a plurality of filtered wavefields. Each of the plurality of full wavefields propagates in all directions. On the other hand, each of the plurality of filtered wavefields is attenuated in or opposite to a target direction. The target direction is selected by the user.

3 Claims, 7 Drawing Sheets

METHOD AND DEVICE FOR ENHANCED SEISMIC IMAGING BASED ON ONE-WAY WAVE EQUATION

CROSS-REFERENCE TO RELATED APPLICATION

This application claims priority to U.S. Provisional Patent Application having Ser. No. 62/786,274, filed on Dec. 28, 2018, which is incorporated herein by reference in its entirety.

FIELD OF TECHNOLOGY

The present disclosure relates generally to a method for collecting and processing seismic data as well as seismic acquisition design. More specifically, the present disclosure provides methods and devices for enhanced wavefield filtering based on one-way wave equation.

BACKGROUND

Seismology is used for exploration, archaeological studies, and engineering projects that require geological information. Exploration seismology techniques are used widely in the oil and gas industry in the exploration to identify prospects and types of geologic formations. In order to apply a seismic investigation of a geological area, the seismic data shall be acquired based on an optimal seismic acquisition system that defines the source and receiver locations for all the shots. With the seismic data as well as seismic processing and imaging techniques are deployed to generate subsurface images of the geologic area for interpretation.

A seismic survey is conducted by sending a seismic wave down into the ground and recording the seismic wave echoed from subsurface formations to the surface with receivers called geophones. The seismic waves are created by an energy source, for example, small explosions or seismic vibrators on land, or air guns or vibrators in marine environments. Multiple energy sources and receivers are placed at various locations near the surface of the earth above a geologic structure of interest. A seismic survey is composed of a very large number of individual seismic recordings or traces that create a near continuous profile of subsurface.

By analyzing the time it takes for the seismic waves to reflect off of subsurface formations and return to the surface recorded in these traces, a geophysicist can map subsurface formations and anomalies and predict where oil or gas might be trapped in sufficient quantities for exploration activities. A two-dimensional (2D) seismic survey is conducted along a single line on the ground, and their analysis creates a two-dimensional cross section picture akin to a vertical slice through the earth beneath that line. In a three dimensional (3D) survey, the source and recording locations are distributed in a grid pattern. The analysis of a 3D data shows a 3D picture of the subsurface geology beneath the survey area.

The process that maps the seismic traces to subsurface interfaces is known as migration. Migration takes seismic section and moves the reflection events back to their origin at the subsurface interface. Reverse time migration (RTM) is a migration method where the reflection traces are reversed in time as the source-time history at each geophone. These geophones now act as sources of seismic energy and the fields are back-propagated into the earth medium. Two-way wave equation based RTM has become a standard imaging algorithm for challenging imaging areas with complex structures associated with large velocity variations and steep dips. The image of RTM is constructed by taking the zero-lag cross-correlation of source and receiver wavefields. However, it often produces strong low-wavenumber artifacts in the shallow parts and near interfaces with sharp impedance changes due to the interferences caused by wide-angle diving wave and back-scattering energy from the sharp interfaces.

Creating an RTM angle gather is a process of plotting reflection amplitude along with the subsurface opening angles. Angle gathers can be processed to partially clean up interference noises (such as those mentioned above) and compensate for the velocity imperfection before stacking to generate an improved RTM image. RTM angle gathers can be calculated from the wave propagation direction computed by use the Poynting vector or optical flow algorithms. While the multiple directional approaches may exist, both technologies normally pick up one direction for each spatial point for efficiency. Large directional error happens where the strong interference wavefields, such as wide-angle diving waves and strong back-scattering wavefields from adjacent sharp interfaces, deteriorate the reflections targeted to pick the propagation directions.

Although some post-imaging filtering or muting approaches work well for suppressing artifacts in RTM image, those algorithms which suppress the interference events in the wavefield domain or during applying imaging condition are also effective. Fletcher et al. (2005) proposed to remove the noise by applying a directional damping term to modified non-reflection wave equation which needs to pick the boundary of interests. Liu et al (2007, 2011) proposed a correlation-based imaging condition to eliminate the noise by muting half of the Fourier coefficients in source and receiver wavefields. It is implemented during applying image condition. Whitmore and Crawley (2012) applied the inverse scattering image condition that is a weighted sum of two images, one is a gradient image and other one is a time derivative image. The weight function is typically angle dependent. It can also be implemented to generate RTM angle gathers at the cost of create two angle gathers. However, none of the above approaches can provide the desired source or receiver wave-fields where propagating directions can be further evaluated for variety purposes.

Accordingly, there is a need for an enhanced wavefield filtering technology which extends to all computational domain and improves the performance with wide range of angles, while being computationally inexpensive and simple to apply.

SUMMARY

This disclosure provides a method for seismic processing. The method includes the steps of receiving seismic data comprising seismic waveforms acquired from a plurality of seismic receivers and a plurality of seismic sources in a subterranean area; generating a plurality of full wavefields at a plurality of corresponding propagation time steps based on a seismic velocity and a density model of the subterranean area; and applying a wavefield filter to the plurality of full wavefields to obtain a plurality of filtered wavefields.

Further, each of the plurality of full wavefields propagates in all directions. On the other hand, each of the plurality of filtered wavefields is attenuated in or opposite to a target direction. The target direction is selected by the user.

In one embodiment, the time derivative of each of the plurality of filtered wavefields comprises half of a difference between a time derivative of the corresponding full wavefield and a product between a wave function in the target direction and a spatial gradient of the corresponding full wavefield.

In another embodiment, the time derivative of the filtered wavefield is expressed as $$\frac{\partial p_{\vec{n}}}{\partial t} = \frac{1}{2}\left(\frac{\partial p}{\partial t} \pm rv\|\nabla p\|\right),$$

in which $\|\cdot\|$ represents L2 norm; r is a continuous weighting factor defined as:

$$r = \begin{cases} 1.0 & x \geq x1 \\ \sin\left(\frac{\pi}{2} * \frac{x}{x1}\right) & -x1 < x < x1, \\ -1.0 & x \leq -x1 \end{cases}$$

wherein $x = \vec{n} \cdot \nabla p$, $x_1 = \alpha \|\nabla p\|$, and $\alpha$ is a pre-set value between 0 to 1.

This disclosure also discloses a computing apparatus, e.g., a computer. The computing apparatus has one or more processors as well as a memory system that has one or more non-transitory, computer-readable media storing instructions that, when executed by at least one of the one or more processors, cause the computing system to perform operations.

Such an operation includes steps of receiving seismic data comprising seismic waveforms acquired from a plurality of seismic receivers and a plurality of seismic sources in a subterranean area; generating a plurality of full wavefields at a plurality of corresponding propagation time steps based on a seismic velocity and a density model of the subterranean area; and applying a wavefield filter to the plurality of full wavefields to obtain a plurality of filtered wavefields.

Further, each of the plurality of full wavefields propagates in all directions. On the other hand, each of the plurality of filtered wavefields is attenuated in or opposite to a target direction. The target direction is selected by the user.

In one embodiment, the time derivative of each of the plurality of filtered wavefields comprises half of a difference between a time derivative of the corresponding full wavefield and a product between a wave function in the target direction and a spatial gradient of the corresponding full wavefield. In another embodiment, the time derivative of the filtered wavefield is expressed as $$\frac{\partial p_{\vec{n}}}{\partial t} = \frac{1}{2}\left(\frac{\partial p}{\partial t} \pm rv\|\nabla p\|\right),$$

in which $\|\cdot\|$ represents L2 norm; r is a continuous weighting factor defined as:

$$r = \begin{cases} 1.0 & x \geq x1 \\ \sin\left(\frac{\pi}{2} * \frac{x}{x1}\right) & -x1 < x < x1, \\ -1.0 & x \leq -x1 \end{cases}$$

wherein $x = \vec{n} \cdot \nabla p$, $x_1 = \alpha \|\nabla_p\|$, and $\alpha$ is a pre-set value between 0 to 1.

This disclosure also discloses a non-transitory, computer-readable medium storing instructions. When executed by at least one processor of a computing apparatus, the stored instructions cause the computing system to perform operations.

Such an operation includes steps of receiving seismic data comprising seismic waveforms acquired from a plurality of seismic receivers and a plurality of seismic sources in a subterranean area; generating a plurality of full wavefields at a plurality of corresponding propagation time steps based on a seismic velocity and a density model of the subterranean area; and applying a wavefield filter to the plurality of full wavefields to obtain a plurality of filtered wavefields.

DETAILED DESCRIPTION

Figure 1:
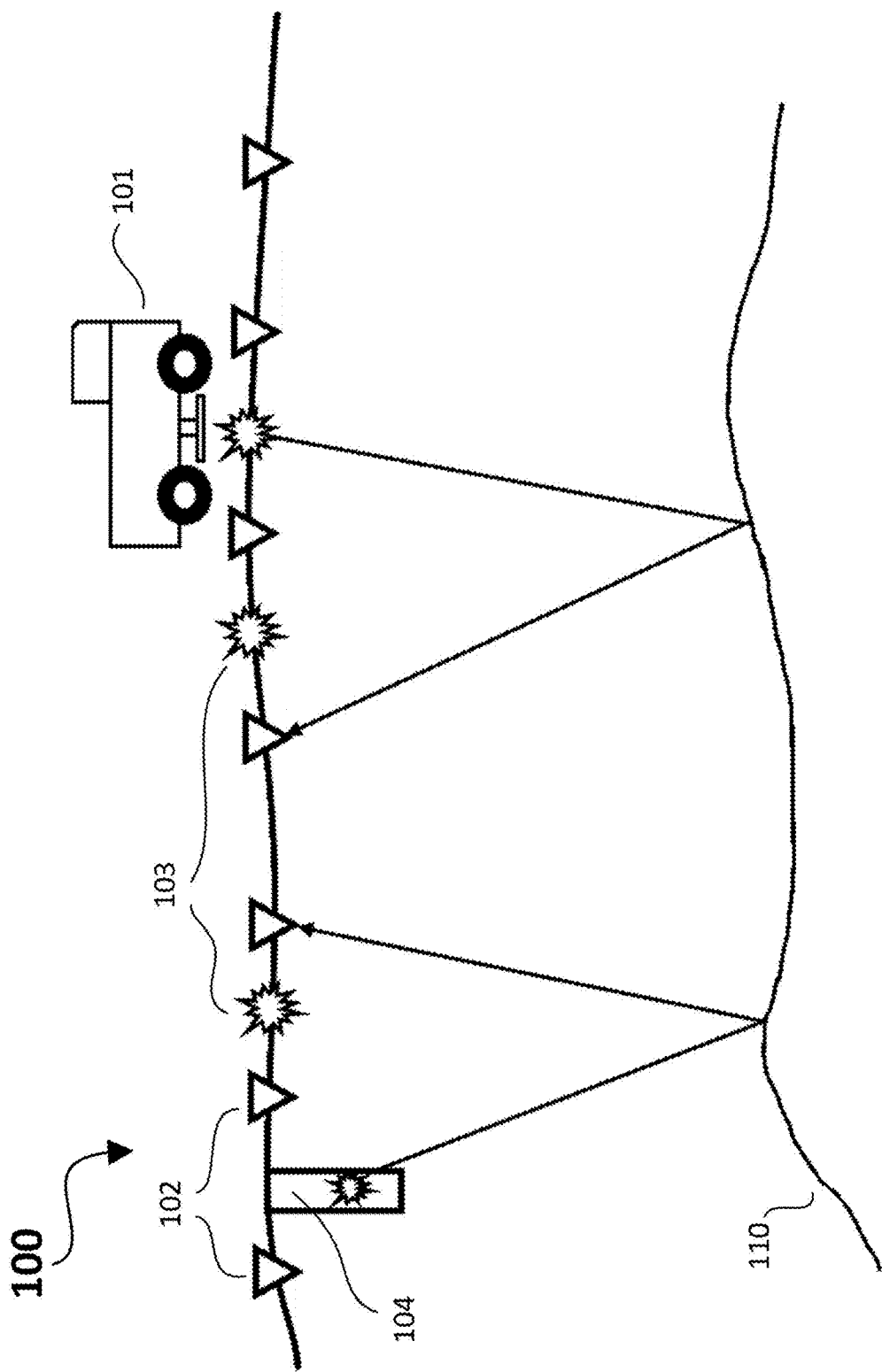
FIG. 1 is a schematic view of seismic survey equipment and procedure.

The present disclosure provides a method involving steps that may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present disclosure may be coded in different languages for application in a variety of computing platforms and environments. It will be appreciated that the scope and underlying principles of the present disclosure are not limited to any particular computer software technology.

Moreover, those skilled in the art will appreciate that the present disclosure may be practiced using any one or combination of hardware and software configurations, including but not limited to a system having single and/or multiple computer processors, hand-held devices, programmable consumer electronics, mini-computers, mainframe computers, and the like. The disclosure may also be practiced in distributed computing environments where tasks are performed by servers or other processing devices that are linked through a one or more data communications network. In a distributed computing environment, program modules may be located in both local and remote computer storage media including memory storage devices.

The Figures (FIG.) and the following description relate to the embodiments of the present disclosure by way of illustration only. It should be noted that from the following discussion, alternative embodiments of the structures and methods disclosed herein will be readily recognized as viable alternatives that may be employed without departing from the principles of the claimed disclosures.

Referring to the drawings, embodiments of the present disclosure will be described. Various embodiments can be implemented in numerous ways, including for example as a system (including a computer processing system), a method (including a computer implemented method), an apparatus, a non-transitory computer readable medium, a computer program product, a graphical user interface, a web portal, or a data structure tangibly fixed in a non-transitory computer readable memory. Several embodiments of the present disclosure are discussed below. The appended drawings illustrate only typical embodiments of the present disclosure and therefore are not to be considered limiting of its scope and breadth.

Reference will now be made in detail to several embodiments of the present disclosure(s), examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles of the disclosure described herein.

FIG. 1 provides a simplified, schematic illustration of a survey operation being performed by a survey tool, such as seismic truck 101 or an explosive source in a hole, to measure properties of the subterranean formation. The seismic truck may be equipped with a seismic vibrator and the explosive source can be a dynamite source, which produces a series of a sound vibrations 103.

Sound vibrations generated by source reflect off subsurface features, such as horizon 110. A set of sound vibrations is received by sensors, such as geophones 102 situated on the earth's surface. The geophones 102 forward data to a computer (not shown), which generates seismic data output. The computer can be located on the seismic truck 101 or another portable or stationary platform.

Seismic survey may also be conducted in a well 104 by deploying a modified wireline tool (not shown) into the well 104. The modified wireline tool may have an explosive, radioactive, electrical, or acoustic energy source, which sends and/or receives signals into the surrounding subterranean formation. The wireline tool may be operatively connected to, for example, geophones 102 and a computer in the seismic truck 101 of FIG. 1. One of the unique advantages of seismic survey using the wireline tool is that the energy source may be deployed at various depths in the well 104, which complements data collected by the surface geophones 102.

Figure 2:
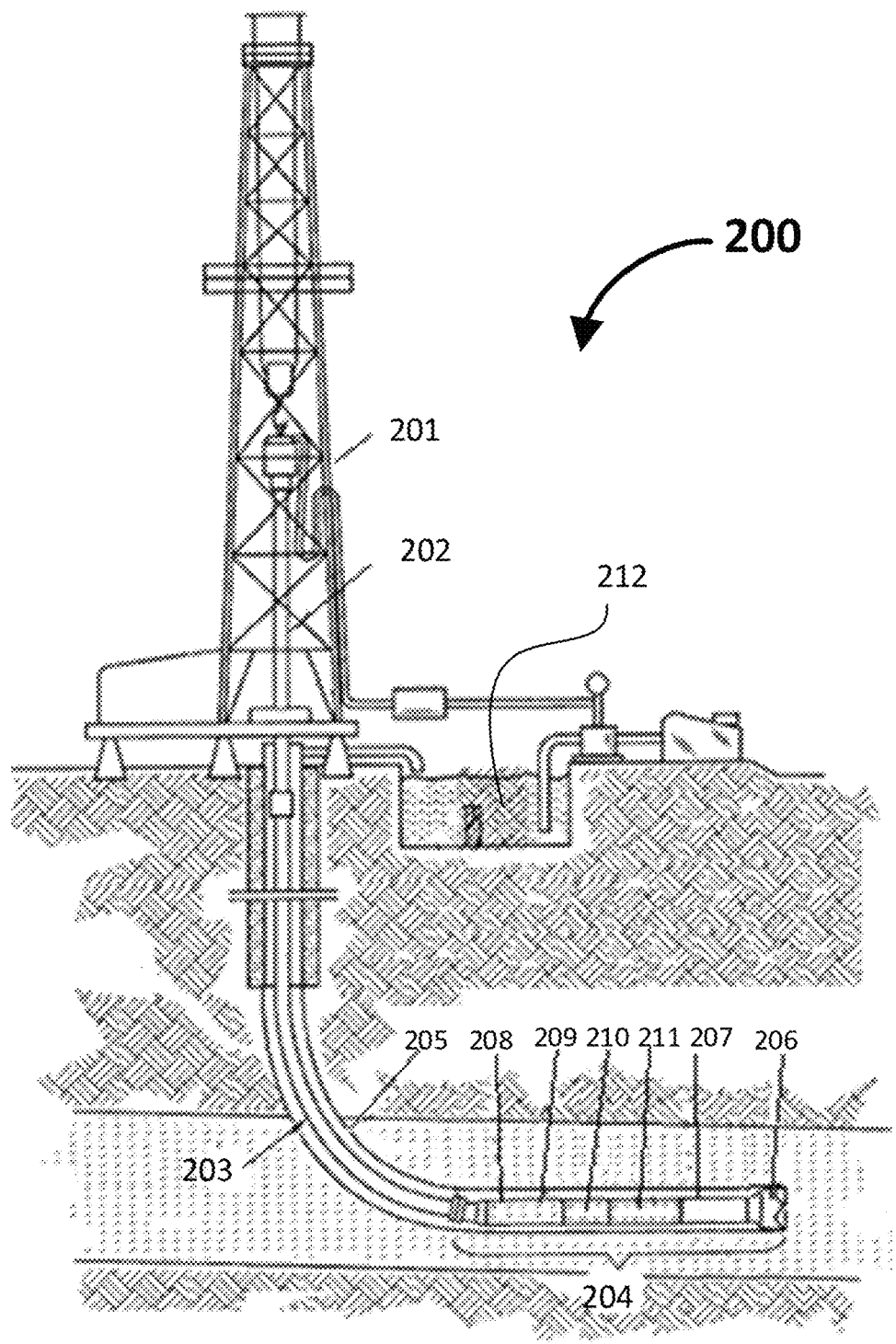
FIG. 2 is a schematic view of a drilling rig and its operations.

FIG. 2 is a schematic diagram showing an oil drilling system at a wellsite. In FIG. 2, the drilling system 200 has a derrick 201 erected above the surface, which is shown as land. However, the drilling system may be over any other surface such as water. A kelly 202 drives a drill string 203 into a borehole 205. The lower part of the drill string 203 is a bottom hole assembly (BHA) 204, which includes a non-magnetic drill collar 208 with a MWD system (MWD assembly) 209 installed therein, LWD instruments 210, a downhole motor 211, the near-bit measurement sub 207, the drill bit 206, etc.

During the drilling operation, the drilling system 200 may operate in the rotary mode, in which the drill string 203 is rotated from the surface either by the rotary table or a motor in the traveling block (i.e., a top drive). The drilling system 200 may also operate in a sliding mode, in which the drill string 203 is not rotated from the surface but is driven by the downhole motor 211 rotating the bit downhole. Drilling mud is pumped from the mud pit 212 through the drill string 203 to the drill bit 6, being injected into the annulus between the drill string 203 and the wall of the borehole 205. The drilling mud carries the cuttings up from the well to the surface.

In one or more embodiments, the MWD system (MWD assembly) 209 may include a pulser sub, a pulser driver sub, a battery sub, a central storage unit, a master board, a power supply sub, a directional module sub, and other sensor boards. In some embodiments, some of these devices may be located in other areas of the BHA 204.

The non-magnetic drill collar 208 has the MWD system 209, which includes a package of instruments for measuring inclination, azimuth, well trajectory, etc. Also included in the non-magnetic drill collar 208 or other locations in the drill string 203 are LWD instruments 210 such as a neutron-porosity measurement tool and a density measurement tool, which contains sensors that measure formation properties such as porosity and density. The instruments may be electrically or wirelessly coupled together, powered by a battery pack or a power generator driven by the drilling mud. All information gathered may be transmitted to the surface via a mud pulse telemetry system, electromagnetic transmission, or other communication system.

The measurement sub 207 may be disposed between the downhole motor 211 and drill bit 206, measuring formation resistivity, gamma ray, and the well trajectory using various sensors. The data may be transmitted through the cable embedded in the downhole motor 211 to MWD or other communication devices. The downhole motor 211 may be connected to a bent housing that is adjustable at the surface from 1° to 3°, preferably up to 4°. Due to the slight bend in the bent housing, the drill bit 206 can drill a curved trajectory.

Sensors are positioned in various other locations in the drilling system in addition to the drilling tool. The measure drilling parameters, such as weight on bit, torque on bit, pressures, temperatures, flow rates, compositions, rotary speed, and/or other parameters of the field operation. The data gathered by sensors are collected for analysis or other processing. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

A surface unit (not shown) may be positioned at the wellsite and/or at remote locations. It contains one or more computers as well as transceivers, which are used to communicate with the drilling tools and/or offsite operations, as well as with other surface or downhole sensors. For example, the surface unit may send commands to the drilling tools, and to receive data therefrom. It may also collect data generated during the drilling operation and produce data output, which may then be stored or transmitted on site in the surface unit or remotely. Based on the analysis, the surface unit may relay command or execute command to one or more controller for actuating mechanisms in the drilling system, such as controlling drilling direction, weight on bit, pump rates, or other parameters. These adjustments may be made automatically based on computer protocol, and/or manually by an operator.

While FIGS. 1 and 2 illustrate seismic survey and drilling in an oilfield on land, the same principles and similar tools of seismic survey and oil exploration may be applicable to underwater oilfields. Also, while FIGS. 1 and 2 show a single oilfield measured at a single location, oilfield applications may be utilized with any combination of one or more oilfields, one or more processing facilities and one or more wellsites.

Figure 3:
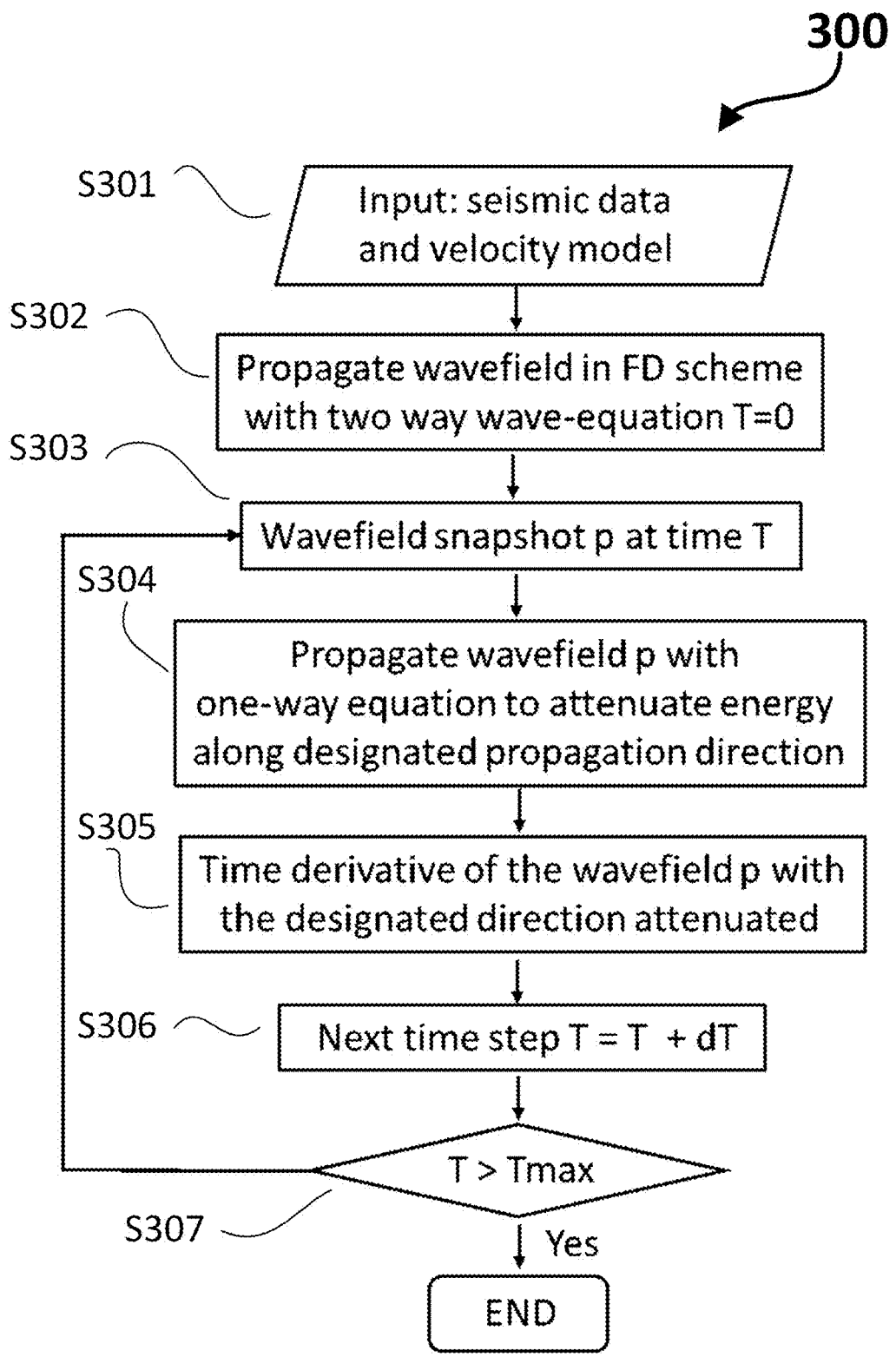
FIG. 3 illustrates a flowchart of a method of seismic processing according to an embodiment in this disclosure.

FIG. 3 is a flowchart of a method for seismic processing according an embodiment of the current disclosure. The method 300 includes obtaining seismic data from one or more seismic sources and receivers as well as a velocity model in step S301. The seismic receivers may be one or more physical seismic acquisition devices, such as geophones, which is collected from a survey of a physical subterranean formation. In step S302, the wavefield p is calculated with finite difference (FD) simulation with two-way wave-equation at time zero (T=0), followed by S303—capturing the wavefields at time T (i.e., taking snapshot), which is at an increment of dT from T=0. In step S304, the wavefield p is propagated with one-way equation to attenuate energy along designated propagation direction. Accordingly, the full wavefield p is filtered in step S304. As a result, S305 obtains the time derivative of the wavefield with the designated direction attenuated, i.e., time derivative of the filtered wavefield. The time stamp T is increased by a time differential dT in step S306 and steps S302 to S307 reiterate until T is greater than a preset value Tmax. As such, a series of snapshots of the full wavefield as well as a corresponding number of filtered wavefield are obtain.

In one embodiment, S301 may employ one dimensional acoustic scalar wave equation—Equation (1):

$$\frac{\partial^2 p}{\partial^2 t} = v^2 \frac{\partial^2 p}{\partial^2 x}, \quad (1)$$

where p represents the total wavefield, v is the acoustic velocity. Two solutions of the second order wave-equation (1) are:

$$\frac{\partial p_l}{\partial t} = +v \frac{\partial p_l}{\partial x}, \quad (2)$$

$$\frac{\partial p_r}{\partial t} = -v \frac{\partial p_r}{\partial x}, \quad (3)$$

$$p = p_l + p_r, \quad (4)$$

$p_l$ and $p_r$ represents the left- and right-going wavefield, respectively.

Equations (2)-(4) can be rewritten as:

$$\frac{\partial p_l}{\partial t} = \frac{1}{2}\left(\frac{\partial p}{\partial t} + v \frac{\partial p}{\partial x}\right), \quad (5)$$

$$\frac{\partial p_r}{\partial t} = \frac{1}{2}\left(\frac{\partial p}{\partial t} - v \frac{\partial p}{\partial x}\right). \quad (6)$$

Equation (7) can be obtained by combining Equations (5) and (6):

$$\frac{\partial p_{\vec{n}}}{\partial t} = \frac{1}{2}\left(\frac{\partial p}{\partial t} - v\vec{n} \cdot \nabla p\right), \quad (7)$$

where $\vec{n}$ is directional unit vector, or directional cosines. Equation (7) provides wavefield that propagates along $\vec{n}$, i.e., the target direction. Note that the target direction can be determined by a user. Equation (7) is also valid for both two and three dimensional cases. The wavefield along the direction opposite to $\vec{n}$ can be obtained by change "−" to "+" in Equation (7).

Further, an enhanced version of Equation (7) is expressed as:

$$\frac{\partial p_{\vec{n}}}{\partial t} = \frac{1}{2}\left(\frac{\partial p}{\partial t} \pm rv\|\nabla p\|\right), \quad (8)$$

wherein $\|\bullet\|$ represents L2 norm; r is a continuous weighting factor defined as:

$$r = \begin{cases} 1.0 & x \geq x1 \\ \sin\left(\frac{\pi}{2} * \frac{x}{x1}\right) & -x1 < x < x1, \\ -1.0 & x \leq -x1 \end{cases} \quad (9)$$

$$x = \vec{n} \cdot \nabla p, \; x_1 = \alpha\|\nabla p\|, \; 0.0 < \alpha < 1.0.. \quad (10)$$

α is a user defined parameter between 0.0 and 1.0, which controls the filtering effect away from the direction $\vec{n}$. The vector the wavefield p is a spatial gradient of p. When α=1.0, and replacing $$\sin\left(\frac{\pi}{2} * \frac{x}{x_1}\right) \text{ with } \frac{x}{x_1},$$

Equation (8) is the same as Equation (7); when α is small, more energy away from the preferred direction will be kept or filtered out by changing "±" to "+" or "−", respectively. As such, the filtering effect is not only limited to one target direction but can be implemented within an adjustable angle from the target direction.

Equations (7) or (8) indicate that the output from the wavefield filter is a time derivative of the wavefield. The computational cost of calculating the time derivative and spatial gradient of the wavefield is O(N)—the big O notation—with N representing the total number of grids on wavefield simulation. In many cases, the time derivative and spatial gradient are already available in every step for the wavefield simulation so that the computational cost for using the method of the current disclosure is low.

Figure 4:
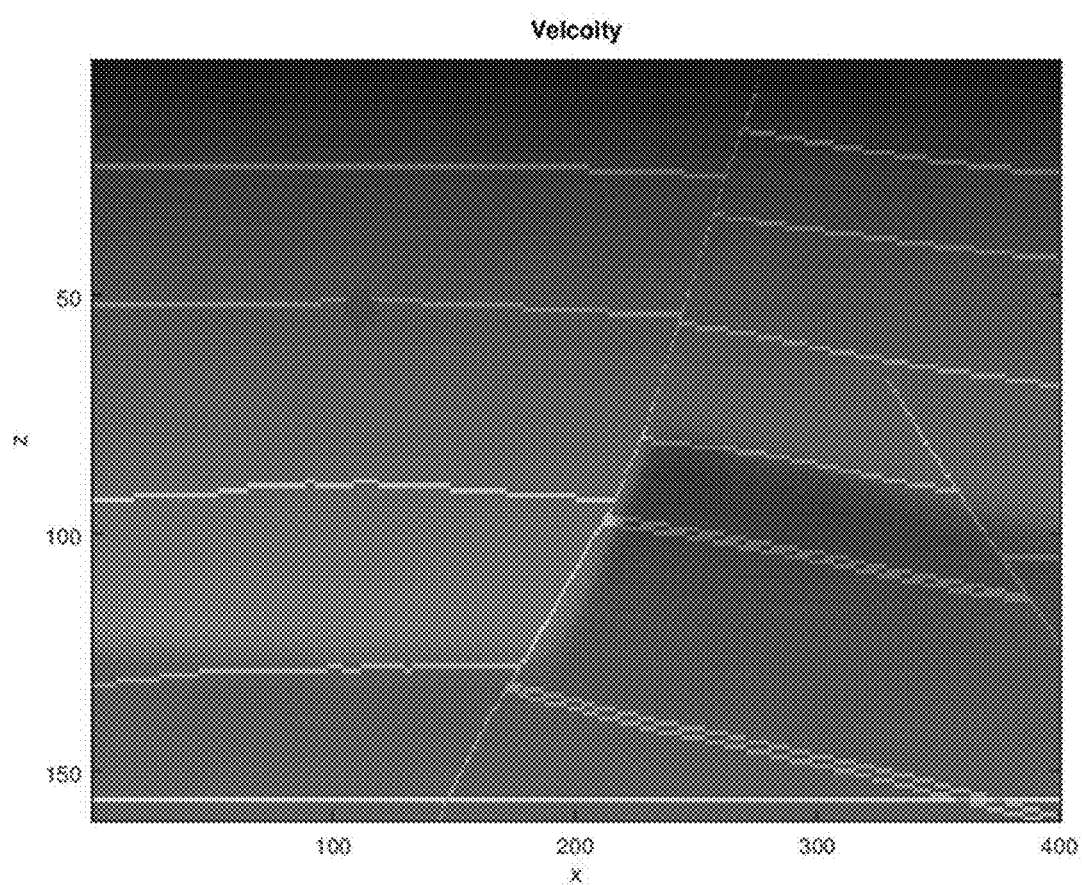
FIG. 4 is a 2D depiction of a 3D salt model.

FIGS. 4-7 show numerical examples that illustrates results of the methods of the current disclosure. FIG. 4 shows a 2D slice of the SEG (The Society of Exploration Geophysicists) 3D salt model. Model size is 10 km by 4 km with collection points at an interval of 25 m. The energy source is located at a depth Z=1.25 km and X=2.5 km. The simulation uses a time step of 0.002 s and a Ricker wavelet with dominant frequency of 10 Hz.

Figure 5:
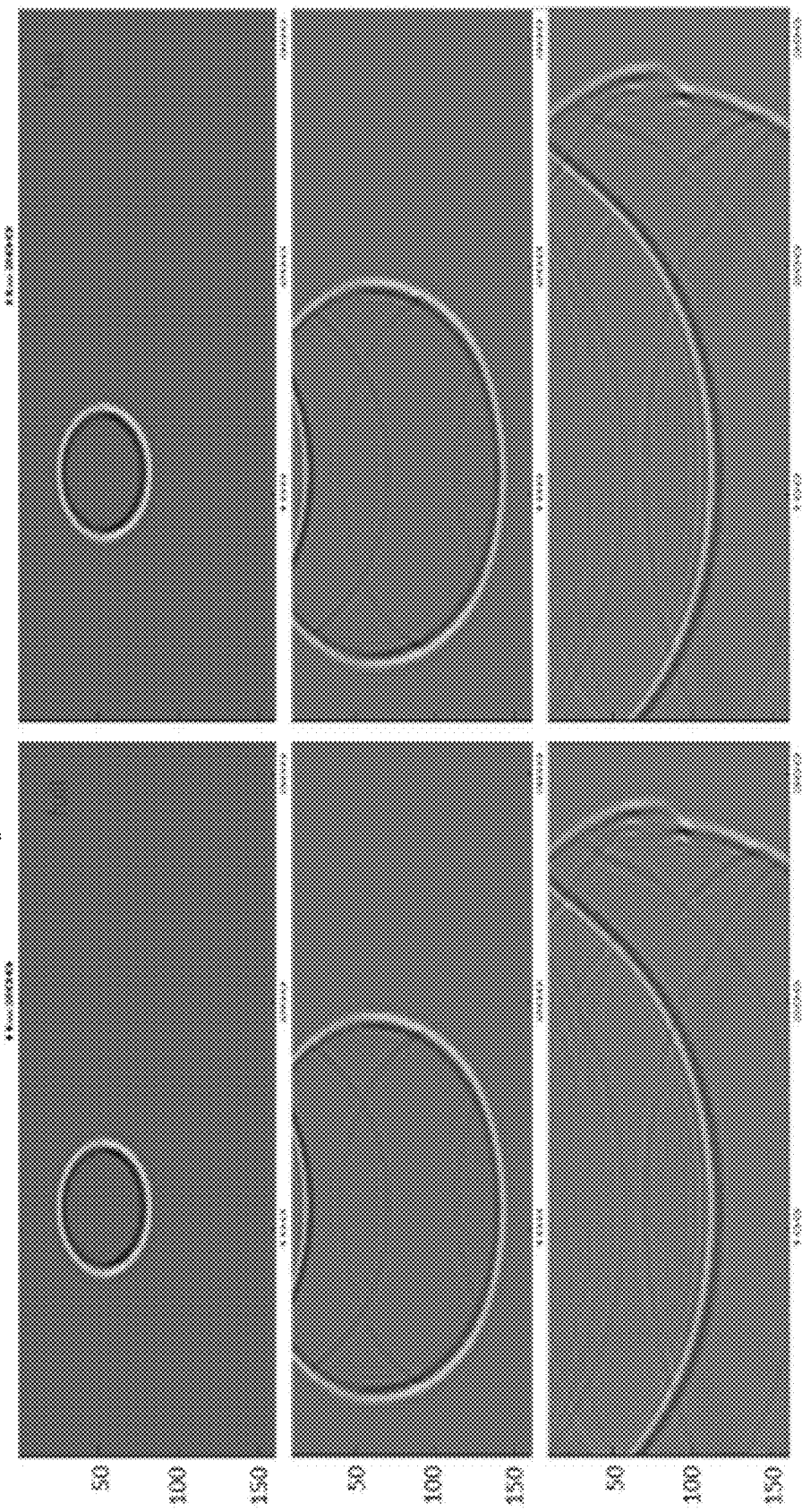
FIG. 5 shows wavefield snapshots at 0.4 sec, 1.0 sec, and 2.0 sec.

FIG. 5 shows the full wavefield snapshots at 0.2 s (top panels), 1.0 s (middle panels), and 2.0 s (bottom panels), respectively. The full wavefield is calculated with finite difference (FD) simulation with 2nd and 4th order accuracy in time and space, respectively. The left and right figures are the same. No filtering in any direction has been applied so that the wave propagates in all directions.

Figure 6:
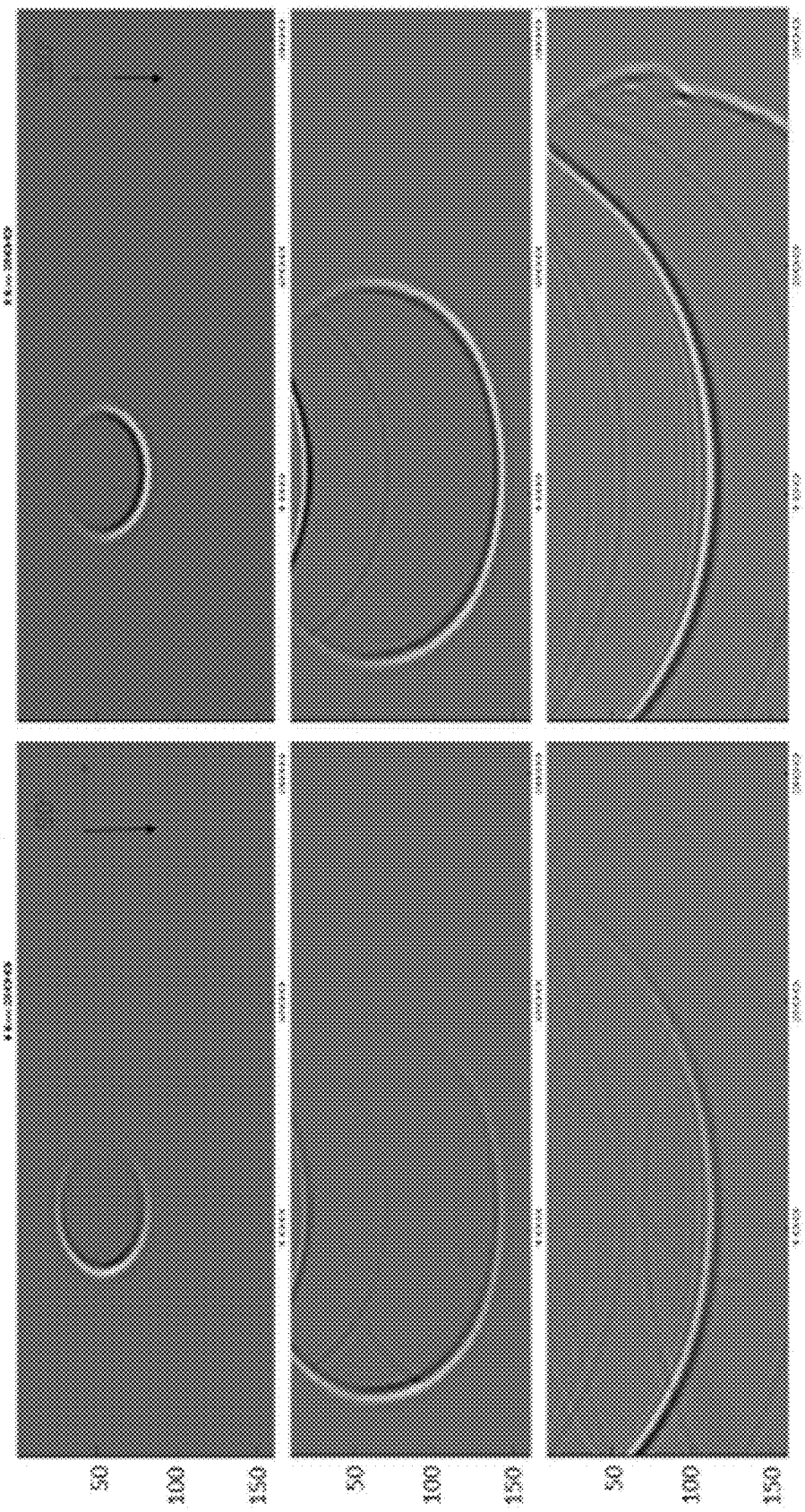
FIG. 6 shows the same snapshots as in FIG. 5 after enhanced wavefield filtering according to an embodiment in this disclosure.
Figure 7:
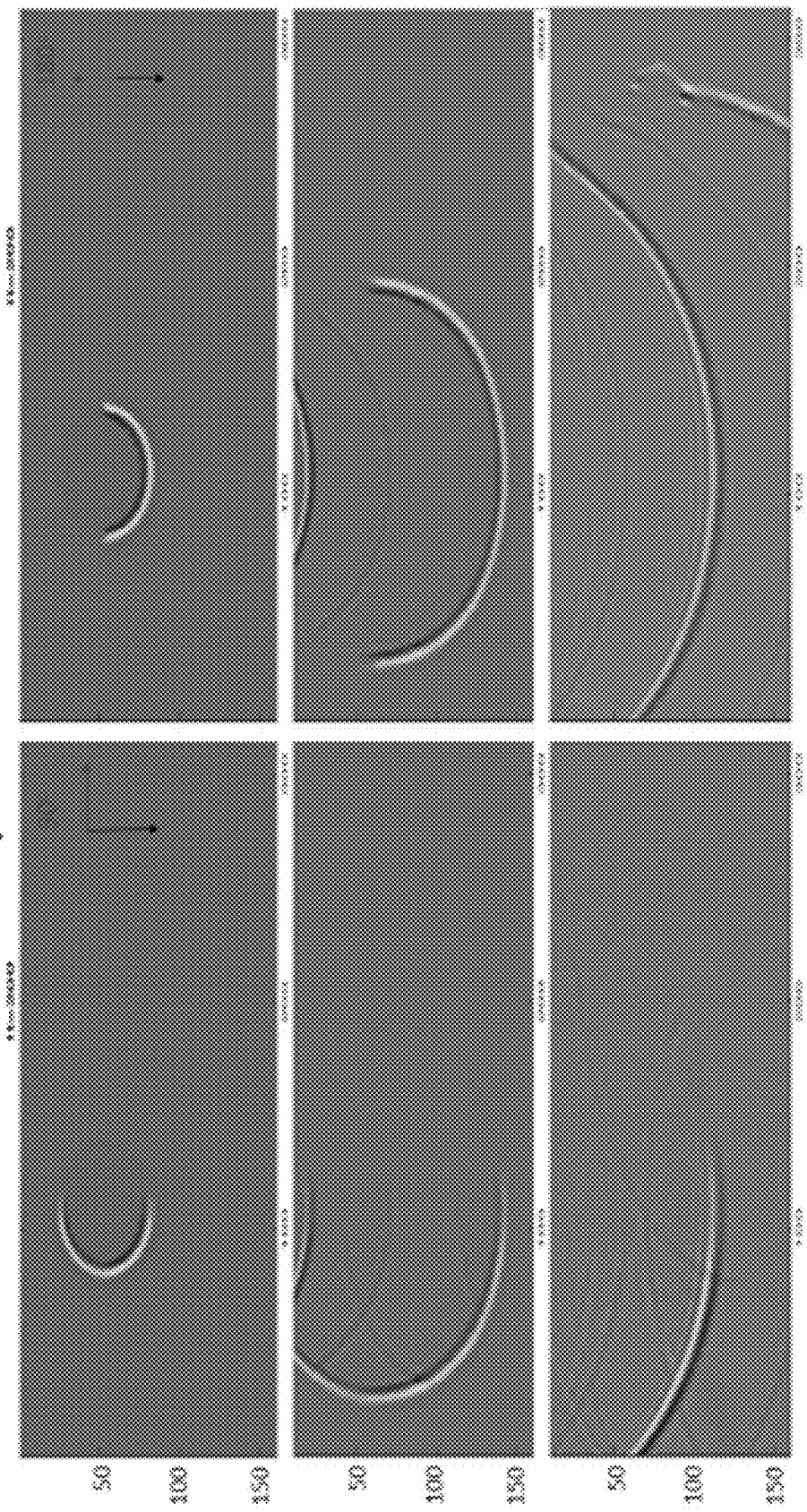
FIG. 7 shows the same snapshots as in FIG. 5 after enhanced wavefield filtering according to another embodiment in this disclosure.

FIGS. 6 and 7 show the same wavefield snapshots as in FIG. 5 except that the snapshots in FIGS. 6 and 7 have been filtered. Results in FIG. 6 were obtained after applying wavefield filter based on Equation (7) with east-going (left panels) and up-going (right panels) wavefields attenuated. Results in FIG. 7, on the other hand, were obtained after applying wavefield filter based on Equation (8) with east-going (left panels) and up-going (right panels) wavefields attenuated. In particular, in FIG. 7, α=0.25 is used, which is equivalent to attenuating all the wavefields about 80 degrees away from the target directions. Comparison between the full wavefields in FIG. 5 and the attenuated wavefields both in FIGS. 6 and 7 indicates that the wavefield filter approach works well for attenuating the wave energy propagating along certain directions. In particular, the enhanced filtering shown in Equation (8) performs better to attenuate the wavefields away from the target directions.

In the image processes, the filtered wavefield snapshots can be used to attenuate the noises caused by the undesirable wavefields propagating along certain directions, and enhance the weak signals accounted for the desirable wavefields propagating in the opposite directions. For an example, if the up-going wavefields for both the source and receiver wavefields have been attenuated (FIG. 7 right panels), the reverse-time migration image then is free of the strong low wavenumber back-scattering artifacts. Similarly, if the right- or left-going wavefields are kept (FIG. 7 left panels), the images of the complex salt flanks with steep-dips can then be enhanced. In addition, the wavefields with the strong up-going back-scattering noises attenuated are more favorable for angle decomposition algorithms, such as the optical flow and Poynting vector, to better define the wave propagating directions of the signals, and thus generate more reliable reverse-time angle gathers for angle versus amplitude analysis.

In some embodiments, any of the methods described herein may be executed by a computing system. The computing system may include a computer or computer system, which may be an individual computer system or a plurality of distributed computer systems. The computer system includes one or more analysis module(s) configured to perform various tasks according to some embodiments, such as one or more methods disclosed herein. To perform these various tasks, the analysis module executes independently, or in coordination with, one or more processors, which is (or are) connected to one or more storage media.

The processor can include a microprocessor, microcontroller, processor module or subsystem, programmable integrated circuit, programmable gate array, or another control or computing device. The processor may be connected to a network interface to allow the computer system to communicate over a data network with one or more additional computer systems and/or computing systems.

The storage media may be implemented as one or more computer-readable or machine-readable storage media. The storage media may be within a computer system that is located in one facility but can also be distributed in multiple facilities, including in the cloud. Storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. The instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be noted that the steps in the methods disclosed herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to methods discussed herein. This can include use of feedback loops executed on an algorithmic basis, such as at a computing device, and/or through manual control by a user who may make determinations regarding whether a given step, action, template, model, or set of curves has become sufficiently accurate for the evaluation of the subsurface three-dimensional geologic formation under consideration.

While in the foregoing specification this disclosure has been described in relation to certain preferred embodiments thereof, and many details have been set forth for purpose of illustration, it will be apparent to those skilled in the art that the disclosure is susceptible to alteration and that certain other details described herein can vary considerably without departing from the basic principles of the disclosure. In addition, it should be appreciated that structural features or method steps shown or described in any one embodiment herein can be used in other embodiments as well.

What is claimed is:

1. A method for seismic processing, comprising:
   conducting seismic survey using a plurality of seismic receivers and one or more seismic sources to acquire seismic data comprising seismic waveforms in a subterranean area;
   generating, using the acquired seismic data, a plurality of full wavefields at a plurality of corresponding propagation time steps based on a seismic velocity and a density model of the subterranean area; and
   applying a wavefield filter to the plurality of full wavefields to obtain a plurality of filtered wavefields,
   wherein each of the plurality of filtered wavefields is attenuated in or opposite to a target direction,
   wherein each of the plurality of full wavefields propagate in all directions,
   wherein a time derivative of each of the plurality of filtered wavefields comprises half of a difference between a time derivative of the corresponding full wavefield and a product between a wave function in the target direction and a spatial gradient of the corresponding full wavefield,
   wherein the time derivative of each of the plurality of filtered wavefields is expressed as $$\frac{\partial p_{\vec{n}}}{\partial t} = \frac{1}{2}\left(\frac{\partial p}{\partial t} \pm rv\|\nabla p\|\right)$$

wherein $\|\bullet\|$ represents L2 norm, v represents acoustic velocity, and wherein r is a continuous weighting factor defined as:

$$r = \begin{cases} 1.0 & x \geq x1 \\ \sin\left(\frac{\pi}{2} * \frac{x}{x1}\right) & -x1 < x < x1, \\ -1.0 & x \leq -x1 \end{cases}$$

wherein $x = \vec{n} \cdot \nabla p$, $x_1 = \alpha\|\nabla_p\|$, and $\alpha$ is a pre-set value between 0 to 1.

2. The method of claim 1, wherein the plurality of seismic receivers are geophones.

3. The method of claim 1, wherein the one or more seismic sources are chosen from a seismic truck, a wireline tool, an explosive source, or combinations thereof.

* * * * *